United States Patent

Fujita et al.

(10) Patent No.: US 7,989,379 B2
(45) Date of Patent: Aug. 2, 2011

(54) OPTICAL GLASS

(75) Inventors: Syunsuke Fujita, Otsu (JP); Koichi Yabuuchi, Otsu (JP)

(73) Assignee: Nippon Electric Glass Co., Ltd., Otsu-shi, Shiga (JP)

( * ) Notice: Subject to any disclaimer, the term of this patent is extended or adjusted under 35 U.S.C. 154(b) by 381 days.

(21) Appl. No.: 11/922,888

(22) PCT Filed: Jun. 29, 2006

(86) PCT No.: PCT/JP2006/312983
§ 371 (c)(1),
(2), (4) Date: Dec. 26, 2007

(87) PCT Pub. No.: WO2007/001048
PCT Pub. Date: Jan. 4, 2007

(65) Prior Publication Data
US 2009/0023575 A1   Jan. 22, 2009

(30) Foreign Application Priority Data
Jun. 29, 2005   (JP) .............................. P.2005-189614

(51) Int. Cl.
C03C 3/089 (2006.01)
C03C 3/091 (2006.01)
G02B 6/38 (2006.01)

(52) U.S. Cl. ............... 501/65; 501/66; 501/67; 501/54; 385/76

(58) Field of Classification Search ............... 501/54, 501/65, 66, 67; 385/76
See application file for complete search history.

(56) References Cited

U.S. PATENT DOCUMENTS

| | | | |
|---|---|---|---|
| 4,110,097 A * | 8/1978 | Chevallier et al. ............ 65/134.3 |
| 5,281,562 A * | 1/1994 | Araujo et al. .................... 501/32 |
| 5,481,634 A * | 1/1996 | Anderson et al. ................ 385/76 |
| 5,528,107 A * | 6/1996 | Marlor et al. .................... 313/636 |
| 5,747,399 A * | 5/1998 | Kosokabe et al. ............... 501/67 |
| 5,790,732 A * | 8/1998 | Ueda ............................... 385/84 |
| 5,994,248 A * | 11/1999 | Gandarillas-Lastra et al. ............................... 501/55 |
| 6,118,216 A * | 9/2000 | Marlor ........................... 313/636 |
| 6,635,592 B1 * | 10/2003 | Kosokabe et al. ............... 501/14 |
| 6,667,260 B2 * | 12/2003 | Kunert et al. ................... 501/66 |
| 6,794,323 B2 * | 9/2004 | Peuchert et al. ................ 501/66 |
| 7,155,934 B2 * | 1/2007 | Lauten-Schlaeger et al. ........................... 65/30.12 |
| 7,217,673 B2 * | 5/2007 | Naumann et al. ............... 501/66 |
| 7,375,043 B2 * | 5/2008 | Fechner et al. .................. 501/65 |
| 7,513,696 B2 * | 4/2009 | Wada et al. ...................... 385/88 |
| 2003/0087745 A1 * | 5/2003 | Peuchert et al. ................ 501/66 |
| 2003/0152341 A1 * | 8/2003 | Sakamoto et al. .............. 385/96 |
| 2005/0037911 A1 * | 2/2005 | Fechner et al. ................. 501/66 |
| 2006/0205583 A1 * | 9/2006 | Naumann et al. ............... 501/66 |
| 2008/0193087 A1 * | 8/2008 | Ishida et al. ..................... 385/84 |

FOREIGN PATENT DOCUMENTS

| | | |
|---|---|---|
| EP | 634373 A1 * | 1/1995 |
| JP | 52-135322 | 11/1977 |
| JP | 2-30640 | 2/1990 |
| JP | 2-74536 | 3/1990 |
| JP | 4-223412 | 8/1992 |
| JP | 8-325031 | 12/1996 |
| JP | 2000-128572 | 5/2000 |
| JP | 2006-53537 | 2/2006 |
| WO | WO 02081394 A1 * | 10/2002 |
| WO | WO 2005019893 A1 * | 3/2005 |
| WO | WO 2006008965 A1 * | 1/2006 |

OTHER PUBLICATIONS

Derwent 2000-403019 and Machine Translation of JP 2000-128572 A, May 9, 2000.*
International Search Report for PCT/JP2006/312983 mailed Aug. 1, 2006.

* cited by examiner

*Primary Examiner* — Karl E Group
*Assistant Examiner* — Elizabeth A Bolden
(74) *Attorney, Agent, or Firm* — Drinker Biddle & Reath LLP

(57) ABSTRACT

The present invention provides a glass having a refractive index and a coefficient of thermal expansion close to those of quartz glass, respectively, and also having anti-devitrification properties excellent enough to avoid the development of defects such as devitrification on the glass surface even when it is molded by drawing process or reheat forming, more specifically an optical glass for use in optical communication devices, particularly an optical glass for use in a stub.
The optical glass of the invention is composed of a borosilicate glass having a refractive index of from 1.44 to 1.46, a coefficient of thermal expansion of from $10 \times 10^{-7}$ to $50 \times 10^{-7}$/° C., and a liquidus viscosity of $10^{5.5}$ dPa·s or more.

19 Claims, 2 Drawing Sheets

OPTICAL GLASS

This application is the U.S. national phase of International Application No. PCT/JP2006/312983, filed 29 Jun. 2006, which designated the U.S. and claims priority to Japanese Patent Application No. 2005-189614, filed Jun. 29, 2005, the entire contents of each of which are hereby incorporated by reference.

TECHNICAL FIELD

The present invention relates to an optical glass for use in optical devices. More specifically, it relates to an optical glass for use in optical communication devices such as an optical receptacle. Particularly, the invention relates to an optical glass for use in a stub.

BACKGROUND ART

Recently, a stub (also referred to as a glass rod) or the like has been used in optical communication devices. The stub or the like is placed on an optical axis of a light source exiting from an optical fiber for the purpose of imparting functions such as coupling, branching, and splitting of light and also is mounted on optical communication devices such as an optical receptacle.

For example, Patent Document 1 mentioned below discloses an optical receptacle in which a stub is inserted into a base end part of an inner hole formed in the main body of a semiconductor module, and an end face of the stub is brought into contact with an end face of a plug ferrule inserted into an end side of the above inner hole. The end face (B side in the Document), to be brought into contact with the end face of the ferrule, in the above stub is subjected to spherical grinding. Furthermore, recently, there has been investigated an optical receptacle in which the stub to be inserted into the inner hole of the ferrule is fixed to the inner surface of a sleeve directly by heat treatment. In such an optical receptacle, the sleeve and the stub are strongly fixed and the optical receptacle can realize reduction of production costs and decrease in connection loss and further the adhered position of the stub does not change even under exposure to temperature change and high-temperature and high-humidity environment, so that decrease in coupling efficiency can be inhibited as far as possible.
Patent Document 1: JP-A-4-223412

DISCLOSURE OF THE INVENTION

Problems that the Invention is to Solve

The optical glass of Patent Document 1, which is mounted in optical communication devices such as an optical receptacle and is used through PC (physical contact) connection with optical fibers, is required to exhibit small connection loss at output and input of optical signals with optical fibers. With regard to the connection loss, when the difference in refractive index between an optical fiber and an optical glass is large, there arises a trouble that reflected light is generated at the end face of the optical fiber or at the end face of a component mounted in the optical communication device, so that it is desirable that the refractive index of the optical glass is close to that of the optical fiber composed of quartz glass.

As the optical fiber having a low refractive index almost equal to that of the optical fiber, borosilicate glass may be mentioned. In order to make the refractive index of borosilicate glass close to that of quartz glass, it is necessary that borosilicate glass inevitably contain much amount of $SiO_2$. However, when the $SiO_2$ content is increased, crystals mainly composed of cristobalite tend to be precipitated on the glass surface at re-heating and re-softening of the glass.

Moreover, most of the conventional optical glasses do not have sufficient anti-devitrification properties, so that there are problems that crystals are precipitated from the glass surface during wire drawing or reheat forming for transformation into a desired size or shape and thus high accuracy cannot be maintained, as well as transparency is impaired and thus a function of optical communication essential to optical devices cannot be achieved.

Specifically, as a representative borosilicate glass, Pyrex glass (registered trademark, manufactured by Corning Incorporated) may be mentioned. However, since Pyrex glass has a low liquidus viscosity of $10^{5.0}$ dPa·s, crystals are precipitated from the glass surface during drawing process or reheat forming and thus high accuracy cannot be maintained as well as transparency is impaired and thus an original function of optical communication cannot be achieved. As a result, Pyrex glass cannot be employed in optical communication devices.

On the other hand, when the Vickers hardness of the optical glass used in optical communication devices is remarkably small in comparison with Vickers hardness of optical fibers (about 800), there arise problems that the optical fiber part tends to be convex and the optical glass part tends to be concave when the optical glass and the optical fiber are brought into contact with each other and also fine polishing becomes extremely difficult.

Moreover, when the coefficient of thermal expansion of the optical glass to be used in optical communication devices is remarkably larger than that of the optical fiber, large residual stress is generated between them, and thus there may arise a problem on long-term reliability, for example, the optical fiber may be extruded or retracted depending on the employed environment. Therefore, the coefficient of thermal expansion of the optical glass is desirably close to that of the optical fiber.

Furthermore, recently, output of light passing through the optical devices has been increased. When irradiated with high-output light or ultraviolet rays, the glass is colored and, as a result, transmittance of the glass decreases. Particularly, in the case of ultraviolet rays, the tendency is remarkable and hence, recently, an optical glass excellent in ultraviolet resistance has been desired.

Thus, an object of the invention is to provide a glass having a refractive index and a coefficient of thermal expansion close to those of quartz glass, respectively, and also having anti-devitrification properties excellent enough to avoid the development of defects such as devitrification on the glass surface even when it is molded by drawing process or reheat forming, more specifically to an optical glass for use in optical communication devices, particularly an optical glass for use in a stub. Furthermore, another object of the invention is to provide a glass having a coefficient of thermal expansion close to that of quartz glass and also having transmittance which is hardly decreased even when the glass is irradiated with high-output ultraviolet rays for a long time, more specifically to an optical glass for use in optical communication devices, particularly an optical glass for use in a stub.

Means for Solving the Problems

As a result of various studies, the present inventors have solved the above problems by setting the refractive index, the coefficient of thermal expansion, the liquidus viscosity, and the like of borosilicate glass to appropriate values and thus, they have proposed the invention.

Specifically, in order to achieve the above objects, as the optical glass of the invention, a borosilicate glass having a refractive index of from 1.44 to 1.46, a coefficient of thermal expansion of from $10 \times 10^{-7}$ to $50 \times 10^{-7}/°$ C. in a temperature range of from 30 to 300° C., and a liquidus viscosity of $10^{5.5}$ dPa·s or more is used.

By applying a borosilicate glass as an optical glass and regulating the properties of the glass to those mentioned above, properties suitable as optical devices can be imparted to the optical glass. Namely, since the refractive index of the optical glass of the invention is close to that of the optical fiber composed of quartz glass, generation of reflected light at an end face of the optical fiber or at an end face of a component mounted on an optical communication device can be avoided. Moreover, since the coefficient of thermal expansion of the optical glass of the invention is not largely different from that of the optical fiber, large residual stress is not generated between them, that is, the optical fiber is not extruded or retracted, so that long-term reliability of the optical devices can be secured. Furthermore, since the optical glass of the invention has good anti-devitrification properties, crystals such as cristobalite are not precipitated from the glass surface during drawing process or reheat forming for transformation into a desired size or shape, and thus highly accurate molding can be performed as well as there does not occur an event that transparency is impaired, so that a function of optical communication originally for optical communication devices can be maintained for a long time.

Secondly, according to the optical glass of the invention, the reduction ratio of transmittance at a wavelength of 405 nm is 8% or less when the glass is irradiated with ultraviolet rays of 1.5 kW for 96 hours. Since the optical glass of the invention is excellent in ultraviolet resistance, transmittance of the glass is hardly decreased even when it is exposed to high-output ultraviolet rays for a long time, whereby long-term stability of optical devices can be secured.

Thirdly, the optical glass of the invention contains, as expressed in % by mass in terms of the following oxides, 70 to 85% of $SiO_2$, 1 to 7% of $Al_2O_3$, 10 to 20% of $B_2O_3$, 0 to 5% of MgO, 0 to 5% of CaO, 0 to 5% of BaO, 0 to 5% of SrO, 0 to 5% of ZnO, 0 to 5% of $Li_2O$, 1 to 10% of $Na_2O$, 0.1 to 7% of $K_2O$, 0 to 5% of MgO+CaO+BaO+SrO+ZnO, 0 to 1% of $SnO_2$, and 0 to 1% of $Cl_2$ as a glass composition.

Fourthly, the optical glass of the invention contains, as expressed in % by mass in terms of the following oxides, 75 to 82% of $SiO_2$, 1 to 5% of $Al_2O_3$, 12 to 18% of $B_2O_3$, 0 to 3% of MgO, 0 to 3% of CaO, 0 to 3% of BaO, 0 to 3% of SrO, 0 to 3% of ZnO, 0 to 3% of $Li_2O$, 1 to 5% of $Na_2O$, 0.1 to 5% of $K_2O$, 0 to 3% of MgO+CaO+BaO+SrO+ZnO, 0.1 to 0.5% of $SnO_2$, 0 to 0.5% of $Cl_2$, and 3 to 10% of $Al_2O_3+K_2O$ as a glass composition.

Fifthly, according to the optical glass of the invention, a value of $Na_2O/K_2O$ as a mass fraction is from 0.05 to 40 as the glass composition.

Sixthly, the optical glass of the invention has a Vickers hardness of from 700 to 1100. By regulating the Vickers hardness of the optical glass of the invention within the above range, the Vickers hardness of the optical glass can be matched with the Vickers hardness of the optical fiber (about 800), so that the optical fiber part hardly becomes convex and the optical glass part hardly becomes concave when the optical glass and the optical fiber are brought into contact with each other and fine polishing can be easily performed.

Seventhly, the optical glass of the invention can be used in optical communication devices.

Eighthly, the optical glass of the invention can be used in an optical receptacle.

Ninthly, the optical glass of the invention can be used in a stub.

The term "liquidus viscosity" in the invention refers to a viscosity of a glass at liquidus temperature. The liquidus temperature of a glass refers to a temperature at which crystals begin to precipitate in the glass after a powdery sample having a size of 297 to 500 μm is placed in a boat made of platinum, kept in an electric oven having temperature gradient for 3 hours, and cooled in the air. The liquidus viscosity refers to a value determined by preparing a viscosity curve from the viscosities determined by a platinum ball pulling-up method and calculating viscosity of the glass corresponding the liquidus temperature from the viscosity curve. In this connection, when the glass surface is polished, it becomes easy to judge precipitated positions of crystals precipitated in the glass.

The "refractive index" in the invention refers to a refractive index at 1550 nm, the "coefficient of thermal expansion" refers to an average coefficient of thermal expansion in the temperature range of from 30 to 300° C. measured by a dilatometer, and the "Vickers hardness" refers to a value measured by a method in accordance with JIS Z2244.

The "reduction ratio of transmittance at a wavelength of 405 nm when the glass is irradiated with ultraviolet rays of 1.5 kW for 96 hours" refers to a value measured by the following procedure. Firstly, transmittance $T_1$ at a wavelength of 405 nm is measured on a plate glass having a thickness of 5 mm subjected to optical polishing, using a spectrophotometer UV-3100PC (manufactured by Shimadzu Corporation). Then, the plate glass is irradiated with ultraviolet rays of 1.5 kW in a thickness direction of the plate glass for 96 hours using a high pressure mercury lamp irradiation apparatus (UE0151-326-03C-002, lamp type H(M)015-L31, manufactured by Iwasaki Electric Co., Ltd.). In this regard, distance between the light source and the plate glass is set at 27 cm. Thereafter, using the spectrophotometer UV-3100PC (manufactured by Shimadzu Corporation), transmittance $T_2$ at a wavelength of 405 nm after UV irradiation is measured. Then, a reduction ratio of transmittance at a wavelength of 405 nm after UV irradiation is calculated as $(100 \times (T_1 - T_2)/T_1 \%)$.

Advantage of the Invention

The optical glass of the invention not only has refractive index, coefficient of thermal expansion, and Vickers hardness close to those of quartz glass, respectively, but also has excellent ultraviolet resistance. Furthermore, the optical glass does not develop defects such as devitrification even when it is molded by drawing process or reheat forming and thus it has good anti-devitrification properties.

Figure 1:
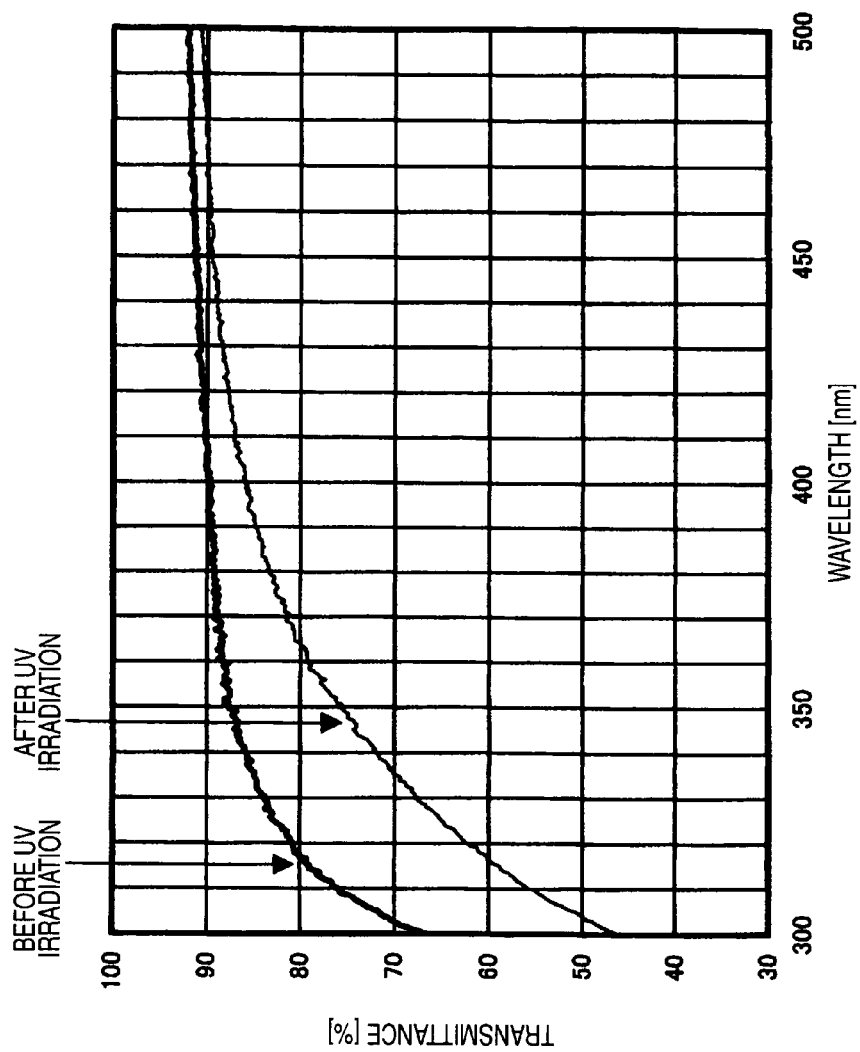
FIG. 1 is a transmittance curve of the glass of Example 5 and a transmittance curve of the glass of Example 5 after irradiated with ultraviolet rays of 1.5 kW for 96 hours.

Description of Reference Numerals and Signs 1 optical receptacle
2 holder
2a holder collar part
3 ferrule holding member (ferrule holding member for optical receptacle)

-continued

Description of Reference Numerals and Signs

| 4 | sleeve made of crystallized glass |
|---|---|
| 5 | stub |
| 5a | first stub end part |
| 5b | second stub end part |

BEST MODE FOR CARRYING OUT THE INVENTION

According to the optical glass of the invention, the refractive index is from 1.44 to 1.46, preferably from 1.449 to 1.46. In order to decrease the refractive index to less than 1.44, the content of $SiO_2$ should be significantly increased and, as a result, viscosity at high temperature of the glass increases and meltability (productivity) of the glass becomes worse. Furthermore, when the refractive index is smaller than 1.44, the difference from the core refractive index of optical fiber (1.449) increases, so that reflected light is generated at an end face of the optical fiber or at an end face of an component mounted on optical communication devices and thus connection loss occurs in optical communication. Similarly, when the refractive index is larger than 1.46, the difference from the core refractive index of the optical fiber increases, so that reflected light is generated at an end face of the optical fiber or at an end face of an component mounted on optical communication devices and thus connection loss occurs in optical communication.

According to the optical glass of the invention, the coefficient of thermal expansion in a temperature range of from 30 to 300° C. is from $10 \times 10^{-7}$ to $50 \times 10^{-7}/°$ C., preferably $25 \times 10^{-7}$ to $45 \times 10^{-7}/°$ C., more preferably $28 \times 10^{-7}$ to $43 \times 10^{-7}/°$ C. When the coefficient of thermal expansion is smaller than $10 \times 10^{-7}/°$ C., the content of $SiO_2$ should be significantly increased and, as a result, viscosity at high temperature increases and meltability of the glass becomes worse. When the coefficient of thermal expansion is larger than $50 \times 10^{-7}/°$ C., the difference in the coefficient of thermal expansion between the optical fiber and the optical glass increases, so that residual stress generated between them increases and the optical fiber may be extruded or retracted depending on the employed environment. Therefore, long-term reliability of the optical devices becomes poor.

According to the optical glass of the invention, the liquidus viscosity is $10^{5.5}$ dPa·s or more, preferably $10^{5.7}$ dPa·s or more, further preferably $10^{5.9}$ dPa·s or more, most preferably $10^{6.1}$ dPa·s or more. When the liquidus viscosity is less than $10^{5.5}$ dPa·s, crystals are precipitated from the glass surface during drawing process or reheat forming for transformation into a desired size or shape and thus high accuracy cannot be maintained as well as transparency is impaired, so that a function of optical communication original for optical devices tends to be impaired.

Moreover, in general, improvement of properties of the glass is achieved by lowering some properties and thus the relation thereof is frequently a relation of tradeoff with other properties. In this regard, in consideration of a balance for satisfying various properties required for the glass, such as the refractive index and the coefficient of thermal expansion, it is a measure to design the liquidus viscosity of the glass to be $10^{8.6}$ dPa·s or less.

Specifically, when the liquidus viscosity is $10^{5.5}$ dPa·s or more, no precipitation of crystals is observed even when the glass having a size of 20 mm×20 mm×5 mm, one side of which is subjected to mirror polishing, is allowed to stand for 60 minutes in a furnace for heat treatment kept at a temperature so as to be a viscosity of $10^{6.0}$ dPa·s which is suitable for drawing process and then taken out and the presence or absence of precipitation of crystals is observed by an optical microscope. However, when the liquidus viscosity is less than $10^{5.5}$ dPa·s, precipitation of crystals is observed when the glass having a size of 20 mm×20 mm×5 mm, one side of which is subjected to mirror polishing, is allowed to stand for 60 minutes in a furnace for heat treatment kept at a temperature so as to be a viscosity of $10^{6.0}$ dPa·s which is suitable for drawing process and then taken out and the presence or absence of precipitation of crystals is observed by an optical microscope.

Similarly, when the liquidus viscosity is $10^{5.5}$ dPa·s or more, no precipitation of crystals is observed even when the glass having a size of 20 mm×20 mm×5 mm, one side of which is subjected to mirror polishing, is allowed to stand in a furnace for heat treatment kept for 60 minutes at a temperature so as to be a viscosity of $10^{8.5}$ dPa·s which is suitable for reheat forming and then taken out and the presence or absence of precipitation of crystals is observed by an optical microscope. However, when the liquidus viscosity is less than $10^{5.5}$ dPa·s, precipitation of crystals is observed when the glass having a size of 20 mm×20 mm×5 mm, one side of which is subjected to mirror polishing, is allowed to stand in a furnace for heat treatment kept for 60 minutes at a temperature so as to be a viscosity of $10^{8.5}$ dPa·s which is suitable for reheat forming and then taken out and the presence or absence of precipitation of crystals is observed by an optical microscope.

Therefore, by setting the liquidus viscosity of the glass to $10^{5.5}$ dPa·s or more, it is possible to obtain an optical glass having such good anti-devitrification properties that it does not develop defects such as devitrification on the glass even when it is molded by drawing process or reheat forming.

According to the optical glass of the invention, the Vickers hardness is preferably from 700 to 1100, more preferably from 750 to 1050, further preferably from 800 to 1000. In the case that the difference in hardness between the glass and the optical fiber is large, for example, in the case that the Vickers hardness is less than 700, the optical fiber part of an end part of a plug ferrule tends to be convex and the optical glass part tends to be concave when the stub and the plug ferrule are butted each other at an optical receptacle. On the other hand, in the case that the Vickers hardness is larger than 1100, the optical fiber part tends to be concave and the optical glass part tends to be convex.

According to the optical glass of the invention, the reduction ratio of transmittance at a wavelength of 405 nm is preferably 8% or less, more preferably 4% or less when the glass is irradiated with ultraviolet rays of 1.5 kW for 96 hours. Recently, a high-output light source such as laser light has been increasingly used in many optical devices. Utilizing excellent light transmitting properties, glasses have been used in various optical devices for the purposes of focusing light, converting it to parallel light, and refracting it. However, when glasses are irradiated with high-output light or ultraviolet rays for a long time, the glasses are some times colored (generally referred to as solarization) and thus there are cases where they cannot be used in optical devices in which high-output ultraviolet rays are used. Thus, if a glass which hardly decrease in transmittance even when irradiated with high-output ultraviolet rays is used, undue restrictions on use are not applied in optical devices and particularly, it can be suitably employed in optical communication devices for which long-term reliability is required. Specifically, in the case that the reduction ratio of transmittance at a wavelength of 405 nm is larger than 8% when the glass is irradiated with ultraviolet rays of 1.5 kW for 96 hours, the glass is colored when used for a long time as an optical glass and transmittance thereof decreases. As a result, since optical properties are deteriorated, there arises a possibility that long-term reliability of the optical devices cannot be secured. In particular, in the case of an optical device where a high-output light source such as laser light is used, the reduction ratio of transmittance increases by the use thereof for a long period, so that the advantages provided by the invention can be more accurately enjoyed in this application.

According to the optical glass of the invention, the reduction ratio of transmittance at a wavelength of 365 nm is preferably 15% or less, more preferably 8% or less when the glass is irradiated with ultraviolet rays of 1.5 kW for 96 hours. In the case that the reduction ratio of transmittance at a wavelength of 365 nm is larger than 15% and the glass is irradiated with ultraviolet rays of 1.5 kW for 96 hours, the glass is colored when used for a long time as an optical glass and transmittance thereof decreases. As a result, since optical properties are deteriorated, long-term reliability of the optical devices is hardly secured. In particular, in the case of an optical device where a high-output light source such as laser light is used, the reduction ratio of transmittance increases by the use thereof for a long period, so that the advantages provided by the invention can be more accurately enjoyed in this use application.

The present inventors have investigated, in particular as a means for improving anti-devitrification properties, a composition in which $SiO_2$-based crystals are difficult to precipitate while various properties necessary as an optical glass are maintained. As a result of various investigations, they have found that the precipitation of the $SiO_2$-based crystals can be inhibited by incorporating $B_2O_3$, $Al_2O_3$, $Na_2O$, and $K_2O$ in adequate amounts, whereby the anti-devitrification properties of the glass can be improved.

Specifically, the glass of the invention is preferably prepared with suitably selecting a composition from the compositional ranges: 70 to 85% of $SiO_2$, 1 to 7% of $Al_2O_3$, 10 to 20% of $B_2O_3$, 0 to 5% of MgO, 0 to 5% of CaO, 0 to 5% of BaO, 0 to 5% of SrO, 0 to 5% of ZnO, 0 to 5% of $Li_2O$, 1 to 10% of $Na_2O$, 0.1 to 7% of $K_2O$, 0 to 5% of MgO+CaO+BaO+SrO+ZnO, 0 to 1% of $SnO_2$, and 0 to 1% of $Cl_2$ as expressed in % by mass so as to achieve a coefficient of thermal expansion of $10 \times 10^{-7}$ to $50 \times 10^{-7}/°$ C. and a liquidus viscosity of $10^{5.5}$ dPa·s or more.

Moreover, the glass of the invention is preferably prepared with suitably selecting a composition from the compositional ranges: 75 to 82% of $SiO_2$, 1 to 5% of $Al_2O_3$, 12 to 18% of $B_2O_3$, 0 to 3% of MgO, 0 to 3% of CaO, 0 to 3% of BaO, 0 to 3% of SrO, 0 to 3% of ZnO, 0 to 3% of $Li_2O$, 1 to 5% of $Na_2O$, 0.1 to 5% of $K_2O$, 0 to 3% of MgO+CaO+BaO+SrO+ZnO, 0.1 to 0.5% of $SnO_2$, 0 to 0.5% of $Cl_2$, and 3 to 10% of $Al_2O_3+K_2O$ as expressed in % by mass so as to achieve a coefficient of thermal expansion of $10 \times 10^{-7}$ to $50 \times 10^{-7}/°$ C. and a liquidus viscosity of $10^{5.5}$ dPa·s or more.

The following will describe reasons for the above limitations of individual ingredients.

$SiO_2$ is an ingredient forming a glass skeleton, has effects of lowering the refractive index and improving the weatherability, and is an essential ingredient. The content thereof is from 70 to 85%, preferably from 73 to 83%, more preferably from 75 to 80%. When the content of $SiO_2$ is more than 85%, there is a tendency that precipitation of crystals containing $SiO_2$ as a main ingredient increases and the anti-devitrification properties are impaired. Moreover, since the viscosity at high temperature becomes extremely high, melting temperature reaches a high temperature of more than 1700° C. and thus problems tend to arise in the meltability of glass. On the other hand, when the content of $SiO_2$ is less than 70%, the refractive index increases, the coefficient of thermal expansion increases, and the Vickers hardness decreases, so that there is a possibility that properties necessary as optical devices cannot be maintained.

$Al_2O_3$ is an ingredient forming a glass skeleton together with $SiO_2$ and is an ingredient contributing to improvement of the anti-devitrification properties. Particularly, by the replacement of $SiO_2$ therewith, the anti-devitrification properties can be extremely improved. The content thereof is from 1 to 7%, preferably from 1 to 5%, more preferably from 1 to 3%. When the content of $Al_2O_3$ is more than 7%, the viscosity at high temperature is remarkably increased, so that the meltability becomes worse. On the other hand, when the content of $Al_2O_3$ is less than 1%, the anti-devitrification properties tend to be impaired.

$B_2O_3$ is an ingredient forming a glass skeleton like $SiO_2$ and $Al_2O_3$ but has an effect of lowering the viscosity at high temperature, so that it is an essential ingredient for lowering the melting temperature and enhancing productivity of glass. The content thereof is from 10 to 20%, preferably from 10 to 18%, more preferably from 12 to 18%. When the content of $B_2O_3$ is more than 20%, vaporization of the ingredient at melting becomes remarkable and there tends to arise a problem that formation of heterogeneous glass such as striae is promoted to obtain no homogeneous glass. Moreover, a phase-separating tendency is sometimes strengthened. On the other hand, when the content of $B_2O_3$ is less than 10%, not only the viscosity at high temperature increases and the meltability of glass becomes worse, but also there is a possibility that the refractive index increases.

$Na_2O$ has an effect of lowering the viscosity at high temperature and is an ingredient of lowering the melting temperature and increasing the productivity of glass. The content thereof is from 1 to 10%, preferably from 1 to 7%, more preferably from 1 to 5%. When the content of $Na_2O$ is more than 10%, the bonding to $B_2O_3$ is strengthened, a phase-separating tendency is increased, and thus it becomes difficult to obtain a homogeneous glass. Moreover, the coefficient of thermal expansion increases and thus necessary properties as optical devices cannot be maintained. On the other hand, when the content of $Na_2O$ is less than 1%, the viscosity at high temperature increases and there is a possibility that the meltability becomes worse.

$K_2O$ is an ingredient contributing to the improvement of the anti-devitrification properties like $Al_2O_3$. However, since $K_2O$ has a strong tendency of increasing the viscosity at high temperature, it is necessary to use it in combination with $B_2O_3$ or $Na_2O$ in order to satisfy both of the meltability and the anti-devitrification properties. The content thereof is from 0.1 to 7%, preferably from 0.3 to 5%, more preferably from 0.6 to 4%. When the content of $K_2O$ is more than 7%, the meltability tends to become worse. On the other hand, when the content of $K_2O$ is less than 0.1%, it becomes difficult to secure the anti-devitrification properties.

In the glass of the invention, when $Al_2O_3$ and $K_2O$ are used in combination, better anti-devitrification properties can be obtained. The total amount thereof is from 3 to 10%, preferably from 4 to 7%. When the total amount thereof is less than 3%, the glass is sometimes devitrified in the vicinity of the viscosity region of $10^{6.0}$ to $10^{8.5}$ dPa·s in which drawing process or reheat forming are carried out, and thus there is a possibility that sufficient anti-devitrification properties cannot be obtained. On the other hand, when the total amount thereof is more than 10%, there is a tendency that the meltability of the glass becomes worse.

Li$_2$O has an effect of remarkably lowering the viscosity at high temperature but the refractive index and the coefficient of thermal expansion are also remarkably increased, so that the content thereof is set at from 0 to 5%, preferably from 0 to 3%.

MgO, CaO, BaO, SrO, and ZnO have an effect of lowering the viscosity at high temperature and inhibiting phase separation. However, all of them have a high tendency of increasing the refractive index and the coefficient of thermal expansion and lowering the Vickers hardness, and hence there is a possibility that properties necessary as optical devices cannot be maintained. Therefore, these ingredients are desirably limited to a total amount of 0 to 5%, preferably 0 to 3%.

SnO$_2$ is an ingredient acting as a fining agent. The glass of the invention has a temperature corresponding to $10^{2.5}$ dPa·s of 1600° C. to 1700° C., the viscosity being a viscosity region at melting. SnO$_2$ is suitable since it has a fining action at the temperature region. The content thereof is from 0 to 1%, preferably from 0.1 to 0.5%. When the content of SnO$_2$ is more than 1%, crystals having SnO$_2$ as a nucleus tend to be precipitated and thus the anti-devitrification properties are apt to be lowered.

Cl$_2$ can be added as a fining agent in combination with SnO$_2$. The content thereof is from 0 to 1%, preferably from 0 to 0.5%. When the content of Cl$_2$ is more than 1%, the anti-devitrification properties tend to be lowered.

Incidentally, other than the above ingredients, other ingredients can be incorporated in a content of up to 10% within a range where the properties of the glass of the invention are not impaired.

The glass of the invention has a value of Na$_2$O/K$_2$O as a mass fraction of preferably from 0.05 to 40, more preferably from 0.1 to 15, further preferably from 0.3 to 7 as the glass composition. As a result of extensive studies, the inventors have found that when the value of Na$_2$O/K$_2$O is regulated within the determined range, transmittance (particularly, transmittance at a wavelength of 405 nm and/or 365 nm) is not reduced even after irradiation with ultraviolet rays for a long time. Namely, when the value of Na$_2$O/K$_2$O is regulated within the predetermined range, since the glass is not colored even when optical devices is used for a long period, reduction of the transmittance can be prevented and, as a result, the long-term reliability of the optical devices can be secured. In particular, since the decrease in the transmittance of the glass can be inhibited even when a high-output light source such as laser light is employed, the advantages of the invention can be more accurately enjoyed in this application. When the value of Na$_2$O/K$_2$O is less than 0.05 as a mass fraction, the glass is colored with the lapse of time and transmittance is reduced after irradiation with ultraviolet rays for a long time, so that it becomes difficult to secure the long-term reliability of optical devices. Similarly, when the value of Na$_2$O/K$_2$O is more than 40 as a mass fraction, the glass is colored with the lapse of time and transmittance is reduced after irradiation with ultraviolet rays for a long time, so that it becomes difficult to secure the long-term reliability of optical devices.

EXAMPLES

The following will describe the invention based on Examples.

Examples of the invention (samples No. 1 to 6) are shown in Table 1 and Comparative Example of the invention (Sample No. 7) is shown in Table 2.

TABLE 1

| | | Example | | | | | |
|---|---|---|---|---|---|---|---|
| | | No. 1 | No. 2 | No. 3 | No. 4 | No. 5 | No. 6 |
| Glass composition (% by mass) | | | | | | | |
| SiO$_2$ | | 75.3 | 76.8 | 77.2 | 77.5 | 79.2 | 80.2 |
| Al$_2$O$_3$ | | 2.0 | 3.7 | 2.7 | 1.5 | 2.5 | 2.2 |
| B$_2$O$_3$ | | 15.2 | 12.7 | 13.7 | 16.7 | 13.4 | 12.1 |
| MgO | | — | 0.5 | — | — | — | — |
| BaO | | 1.2 | — | 0.5 | — | — | — |
| ZnO | | — | 1.0 | — | — | — | — |
| Li$_2$O | | — | — | 0.5 | — | — | — |
| Na$_2$O | | 3.6 | 4.4 | 1.9 | 1.0 | 2.9 | 1.7 |
| K$_2$O | | 2.5 | 0.7 | 3.3 | 3.1 | 1.6 | 3.6 |
| SnO$_2$ | | 0.2 | 0.2 | 0.1 | 0.2 | 0.4 | 0.2 |
| Cl$_2$ | | — | — | 0.1 | — | — | — |
| MgO + CaO + BaO + SrO + ZnO | | 1.2 | 1.5 | 0.5 | — | — | — |
| Al$_2$O$_3$ + K$_2$O | | 4.5 | 4.4 | 6.0 | 4.6 | 4.1 | 5.8 |
| Na$_2$O/K$_2$O (mass fraction) | | 1.44 | 6.29 | 0.58 | 0.32 | 1.81 | 0.47 |
| Refractive index | | 1.458 | 1.453 | 1.457 | 1.452 | 1.452 | 1.454 |
| Coefficient of thermal expansion ($\times 10^{-7}$/° C.) | | 40.5 | 36.6 | 37.7 | 30.8 | 32.5 | 35.4 |
| Vickers hardness | | 770 | 790 | 800 | 810 | 800 | 820 |
| Anti-devitrification properties | Liquidus viscosity (dPa · s) | $10^{6.5}$ | $10^{6.4}$ | $10^{6.8}$ | $10^{6.3}$ | $10^{6.2}$ | $10^{6.4}$ |
| | $10^{6.0}$ dPa · s - 60 min | ◯ | ◯ | ◯ | ◯ | ◯ | ◯ |
| | $10^{8.5}$ dPa · s - 60 min | ◯ | ◯ | ◯ | ◯ | ◯ | ◯ |

TABLE 2

| | Comparative example No. 7 |
|---|---|
| Glass composition (% by mass) | |
| SiO$_2$ | 67.9 |
| Al$_2$O$_3$ | 1.0 |
| B$_2$O$_3$ | 12.7 |
| MgO | — |
| BaO | 1.1 |
| ZnO | — |
| Li$_2$O | — |
| Na$_2$O | 12.3 |

TABLE 2-continued

|  | Comparative example No. 7 |
|---|---|
| $K_2O$ | 4.9 |
| $SnO_2$ | — |
| $Cl_2$ | 0.1 |
| $MgO + CaO + BaO + SrO + ZnO$ | 1.1 |
| $Al_2O_3 + K_2O$ | 5.9 |
| $Na_2O/K_2O$ (mass fraction) | 2.51 |
| Refractive index | 1.497 |
| Coefficient of thermal expansion ($\times 10^{-7}/°$ C.) | 86.0 |
| Vickers hardness | 550 |
| Anti-devitrification properties — Liquidus viscosity (dPa·s) | $10^{5.2}$ |
| $10^{6.0}$ dPa·s-60 min | x |
| $10^{8.5}$ dPa·s-60 min | x |

Each sample was prepared as follows. First, glass raw materials were blended so as to be the composition shown in Table 1 or 2 and melted at 1650° C. for 6 hours using a platinum crucible. After melting, the melt was poured on a carbon plate and, after subsequent annealing, a sample suitable for each measurement was prepared.

As the refractive index, a value measured at 1550 nm using a refractometer (KPR-200 manufactured by Kalnew K.K.) was shown.

As the coefficient of thermal expansion, an average coefficient of thermal expansion was measured in a temperature range of 30 to 300° C. using a dilatometer.

The Vickers hardness was measured by the method in accordance with JIS Z2244.

The liquidus viscosity was determined by preparing a viscosity curve from viscosities determined by a platinum ball pulling-up method and calculating glass viscosity corresponding to a liquidus temperature from the viscosity curve. The liquidus temperature was determined by placing a powdery sample of 297 to 500 µm in a platinum board, keeping it in an electric furnace having a temperature gradient for 3 hours, then standing it to cool in the air, and measuring a temperature, at which crystals begin to precipitate in the glass, using an optical microscope.

With regard to the anti-devitrification properties at $10^{6.0}$ dPa·s, after each glass sample of 20 mm×20 mm×5 mm whose one surface was subjected to mirror polishing was allowed to stand for 60 minutes in a furnace for heat treatment kept at a temperature at which the viscosity becomes $10^{6.0}$ dPa·s suitable for drawing process, it was taken out and the presence or absence of crystal precipitation was observed by an optical microscope. A sample where the precipitation of crystals was not observed was marked by ○ and a sample where the precipitation of crystals was observed was marked by x.

With regard to the anti-devitrification properties at $10^{8.5}$ dPa·s, after each glass sample of 20 mm×20 mm×5 mm whose one surface was subjected to mirror polishing was allowed to stand for 60 minutes in a furnace for heat treatment kept at a temperature at which the viscosity becomes $10^{8.5}$ dPa·s suitable for reheat forming, it was taken out and the presence or absence of crystal precipitation was observed by an optical microscope. A sample where the precipitation of crystals was not observed was marked by ○ and a sample where the precipitation of crystals was observed was marked by x.

As apparent from Table 1, glasses of Examples 1 to 6 had a refractive index of from 1.452 to 1.458, which were close to the refractive index of core of the optical fiber. The coefficient of thermal expansion was such a small value of from 30.8×10 to 40.5×$10^{-7}/°$ C. and the difference from that of the optical fiber was small. The Vickers hardness was from 770 to 820 and was close to the Vickers hardness of the optical fiber. The liquidus viscosity was $10^{6.2}$ dPa·s or more and the anti-devitrification properties were excellent. Furthermore, the anti-devitrification properties at $10^{6.0}$ dPa·s and those at $10^{8.5}$ dPa·s were also excellent.

As a result, the glasses of Examples 1 to 6 had refractive index, coefficient of thermal expansion, and Vickers hardness close to those of the optical fiber, respectively, and crystals were not precipitated from the glass surface during reheat forming or drawing process of the glass, so that the glass can be molded with high accuracy and thus the resulting molding was able to be mounted as an optical communication device, particularly a stub of an optical receptacle.

Furthermore, after the glass of Example 5 was irradiated with ultraviolet rays of 1.5 kW for 96 hours, the reduction ratio of transmittance at a wavelength of 405 nm was measured and was found to be 3.88% (see FIG. 1). Similarly, the reduction ratio of transmittance at a wavelength of 365 nm was measured on the glass of Example 5 and was found to be 8.93%. In this regard, the reduction ratio of transmittance at a wavelength of 405 nm or 365 nm when the glass is irradiated with ultraviolet rays of 1.5 kW was measured by the following procedure. First, transmittance of a plate glass subjected to optical grinding was measured at a wavelength of 405 nm or 365 nm using a spectrophotometer UV-3100 PC (manufactured by Shimadzu Corporation). Then, the plate glass was irradiated with ultraviolet rays of 1.5 kW for 96 hours in a thickness direction of the plate glass using a high-pressure mercury lamp irradiation apparatus (UE0151-326-03C-002, lamp type H(M)015-L31, manufactured by Iwasaki Electric Co., Ltd.). In this regard, distance between the light source and the plate glass was set at 27 cm. Thereafter, using the spectrophotometer UV-3100PC (manufactured by Shimadzu Corporation), transmittance of the plate glass at wavelength of 405 nm or 365 nm after UV irradiation was measured. Then, the reduction ratio of transmittance at a wavelength of 405 nm or 365 nm after UV irradiation was calculated.

On the other hand, since the glass of Comparative Example 7 has a liquidus viscosity of $10^{5.2}$ dPa·s, it is considered that crystals are precipitated from the glass surface during reheat forming or drawing process of the glass, so that the glass cannot be molded with high accuracy and thus the resulting molding cannot be mounted as an optical communication device, particularly a stub of an optical receptacle.

Figure 2:
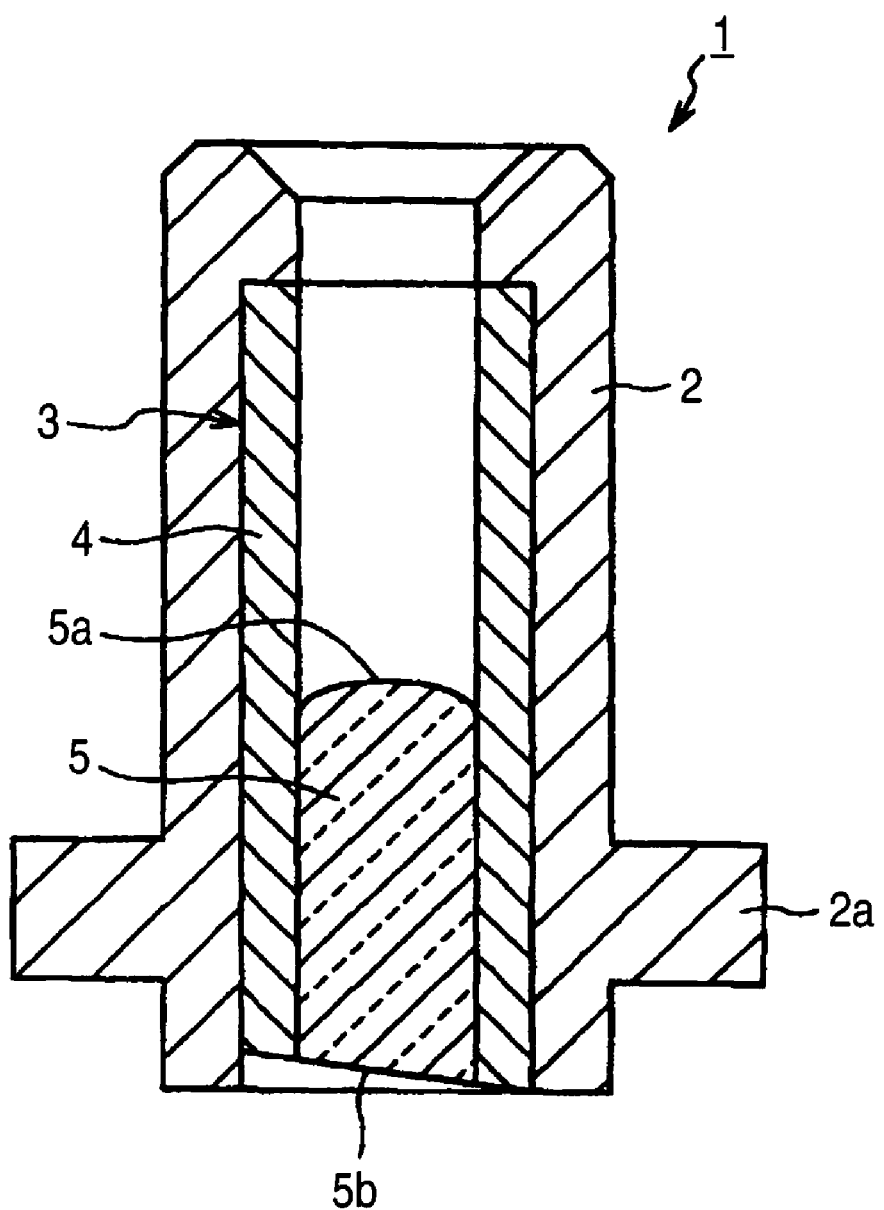
FIG. 2 is a vertical front view showing an optical receptacle using the optical glass of invention.

The following will show an application example wherein the glass of the invention is applied to an optical receptacle as shown in FIG. 2.

As shown in FIG. 2, an optical receptacle 1 is one in which a ferrule-holding member 3 is mounted inside a holder 2 having a collar part at an end part at the base end side. First, the glass of Example 5 was molded into a rod-like shape by drawing process to obtain a stub 5. Furthermore, the stub 5 thus prepared was inserted into an inner hole of a sleeve 4 (a coefficient of thermal expansion of 27×$10^{-7}/°$ C.) made of crystallized glass and the end face at the base end side of the sleeve was leveled with the end face at the base end side of the stub 5 to form an embedded body. In this state, the embedded body was subjected to heat treatment in an electric furnace and the stub 5 was softened to thereby obtain an optical receptacle 1. In this regard, the above heat treatment was performed by heating it at 750° C. for 30 minutes in the electric furnace, subsequently elevating the temperature to a peak temperature of 850° C. at an elevation rate of 20° C./minute, keeping the peak temperature of 850° C. for 10 minutes, and then lowering the temperature at a rate of 20°

C./minute. According to this heat treatment, the stub 5 was softened and fixed to the sleeve 4 with melt-bonding. Then, a plug ferrule connected to OTDR (MW9070B manufactured by Anritsu Corporation) was inserted from an opening part of the sleeve 4 to achieve PC connection with the first stub end part 5*a*. Thus, a reflection attenuation at the connected part between the stub 5 and the plug ferrule was measured. In this regard, by subjecting the second stub end part 5*b* (a stub end part opposite to the side where the plug ferrule was inserted and subjected to PC connection) to flat grinding at a slant of 8° toward a normal line direction of an optical axis, the reflection at the end part could be principally neglected.

As a result, in drawing process in which the glass is molded into a rod-like shape and reheat forming in which the stub 5 is softened, no devitrification was observed on the glass. Moreover, since the difference in the coefficient of thermal expansion between the stub 5 and the sleeve 4 made of crystallized glass was small, no fracture and crack were generated in the stub 5 and the sleeve 4. Furthermore, the obtained reflection attenuation was a good value (45 dB) and thus the glass of Example 5 could be suitably used as an optical receptacle.

While the invention has been described in detail and with reference to specific embodiments thereof, it will be apparent to one skilled in the art that various changes and modifications can be made therein without departing from the spirit and scope thereof.

The present application is based on Japanese Patent Application No. 2005-189614 filed on Jun. 29, 2005, the entire contents thereof being hereby incorporated by reference.

INDUSTRIAL APPLICABILITY

As explained above, since the optical glass of the invention is composed of a borosilicate glass having a refractive index of from 1.44 to 1.46, a coefficient of thermal expansion of $10 \times 10^{-7}$ to $50 \times 10^{-7}/°$ C., and a liquidus viscosity of $10^{5.5}$ dPa·s or more, it is suitable as an optical glass where high performance and high accuracy are required, specifically an optical glass for use in optical communication devices, particularly an optical glass for use in a stub.

Moreover, the optical glass of the invention can also be suitably used in a microlens, a microprism, or the like for use in optical communication devices such as an optical coupler and an optical switch. Furthermore, the optical glass of the invention can be used in wide applications not limited to optical communication and, for example, in an imaging lens or the like. In addition, since the optical glass of the invention is excellent in various properties such as anti-devitrification properties, it can be suitably used in glass for ferrule, particularly an optical connector, stub ferrule, or the like.

The invention claimed is:

1. An optical glass which comprises a borosilicate glass having a refractive index of from 1.44 to 1.46, a coefficient of thermal expansion of from $10 \times 10^{-7}$ to $50 \times 10^{-7}/°$ C. in a temperature range of from 30 to 300° C., a liquidus viscosity of $10^{5.5}$ dPa·s or more, and which contains 75.3 to 85% by mass of $SiO_2$, 10 to 18% by mass of $B_2O_3$, and 0.1 to 7% by mass of $K_2O$ as a glass composition.

2. The optical glass according to claim 1, wherein a reduction ratio of transmittance at a wavelength of 405 nm is 8% or less when the glass is irradiated with ultraviolet rays of 1.5 kW for 96 hours.

3. The optical glass according to claim 1, comprising, as expressed in % by mass in terms of the following oxides, 75.3 to 85% of $SiO_2$, 1 to 7% of $Al_2O_3$, 10 to 18% of $B_2O_3$, 0 to 5% of MgO, 0 to 5% of CaO, 0 to 5% of BaO, 0 to 5% of SrO, 0 to 5% of ZnO, 0 to 5% of $Li_2O$, 1 to 10% of $Na_2O$, 0.1 to 7% of $K_2O$, 0 to 5% of MgO+CaO+BaO+SrO+ZnO, 0 to 1% of $SnO_2$, and 0 to 1% of $Cl_2$ as a glass composition.

4. The optical glass according to claim 1, comprising, as expressed in % by mass in terms of the following oxides, 75.3 to 82% of $SiO_2$, 1 to 5% of $Al_2O_3$, 12 to 18% of $B_2O_3$, 0 to 3% of MgO, 0 to 3% of CaO, 0 to 3% of BaO, 0 to 3% of SrO, 0 to 3% of ZnO, 0 to 3% of $Li_2O$, 1 to 5% of $Na_2O$, 0.1 to 5% of $K_2O$, 0 to 3% of MgO+CaO+BaO+SrO+ZnO, 0.1 to 0.5% of $SnO_2$, 0 to 0.5% of $Cl_2$, and 3 to 10% of $Al_2O_3+K_2O$ as a glass composition.

5. The optical glass according to claim 1, wherein a value of $Na_2O/K_2O$ as a mass fraction is from 0.05 to 40 as a glass composition.

6. The optical glass according to claim 1, which has a Vickers hardness of from 700 to 1100.

7. An optical communication device comprising an optical glass comprising a borosilicate glass having a refractive index of from 1.44 to 1.46, a coefficient of thermal expansion of from $10 \times 10^{-7}$ to $50 \times 10^{-7}/°$ C. in a temperature range of from 30 to 300° C., and a liquidus viscosity of $10^{5.5}$ dPa·s or more, and which contains 75.3 to 85% by mass of $SiO_2$, 10 to 18% by mass of $B_2O_3$, and 0.1 to 7% by mass of $K_2O$ as a glass composition.

8. The optical glass according to claim 1, which is for use in an optical receptacle.

9. A stub comprising an optical glass comprising a borosilicate glass having a refractive index of from 1.44 to 1.46, a coefficient of thermal expansion of from $10 \times 10^{-7}$ to $50 \times 10^{-7}/°$ C. in a temperature range of from 30 to 300° C., and a liquidus viscosity of $10^{5.5}$ dPa·s or more, and which contains 75.3 to 85% by mass of $SiO_2$, 10 to 18% by mass of $B_2O_3$, and 0.1 to 7% by mass of $K_2O$ as a glass composition.

10. The optical glass according to claim 2, comprising, as expressed in % by mass in terms of the following oxides, 75.3 to 85% of $SiO_2$, 1 to 7% of $Al_2O_3$, 10 to 18% of $B_2O_3$, 0 to 5% of MgO, 0 to 5% of CaO, 0 to 5% of BaO, 0 to 5% of SrO, 0 to 5% of ZnO, 0 to 5% of $Li_2O$, 1 to 10% of $Na_2O$, 0.1 to 7% of $K_2O$, 0 to 5% of MgO+CaO+BaO+SrO+ZnO, 0 to 1% of $SnO_2$, and 0 to 1% of $Cl_2$ as a glass composition.

11. The optical glass according to claim 2, comprising, as expressed in % by mass in terms of the following oxides, 75.3 to 82% of $SiO_2$, 1 to 5% of $Al_2O_3$, 12 to 18% of $B_2O_3$, 0 to 3% of MgO, 0 to 3% of CaO, 0 to 3% of BaO, 0 to 3% of SrO, 0 to 3% of ZnO, 0 to 3% of $Li_2O$, 1 to 5% of $Na_2O$, 0.1 to 5% of $K_2O$, 0 to 3% of MgO+CaO+BaO+SrO+ZnO, 0.1 to 0.5% of $SnO_2$, 0 to 0.5% of $Cl_2$, and 3 to 10% of $Al_2O_3+K_2O$ as a glass composition.

12. The optical glass according to claim 4, wherein a value of $Na_2O/K_2O$ as a mass fraction is from 0.05 to 40 as a glass composition.

13. The optical glass according to claim 4, which has a Vickers hardness of from 700 to 1100.

14. The optical glass according to claim 2, which is for use in an optical communication device.

15. The optical glass according to claim 4, which is for use in an optical communication device.

16. The optical glass according to claim 2, which is for use in an optical receptacle.

17. The optical glass according to claim 4, which is for use in an optical receptacle.

18. The optical glass according to claim 2, which is for use in a stub.

19. The optical glass according to claim 4, which is for use in a stub.

* * * * *